United States Patent
Abe et al.

(10) Patent No.: US 11,350,287 B2
(45) Date of Patent: May 31, 2022

(54) SWITCH AND COMMUNICATION METHOD

(71) Applicant: NTT DOCOMO, INC., Tokyo (JP)

(72) Inventors: Motohiro Abe, Tokyo (JP); Shinya Takeda, Tokyo (JP); Kazuto Shimizu, Tokyo (JP); Koichiro Kunitomo, Tokyo (JP); Alf Zugenmaier, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 54 days.

(21) Appl. No.: 16/096,188

(22) PCT Filed: Apr. 21, 2017

(86) PCT No.: PCT/JP2017/016034
§ 371 (c)(1),
(2) Date: Oct. 24, 2018

(87) PCT Pub. No.: WO2017/188149
PCT Pub. Date: Nov. 2, 2017

(65) Prior Publication Data
US 2019/0141521 A1    May 9, 2019

(30) Foreign Application Priority Data

Apr. 25, 2016 (JP) .............................. JP2016-087512

(51) Int. Cl.
*H04W 12/80* (2021.01)
*H04W 12/02* (2009.01)
(Continued)

(52) U.S. Cl.
CPC ......... *H04W 12/80* (2021.01); *H04L 63/0428* (2013.01); *H04L 63/306* (2013.01);
(Continued)

(58) Field of Classification Search
CPC ............. H04W 12/007; H04L 63/0428; H04L 63/306; H04L 63/30; H04L 63/304; H04L 43/00; H04L 65/1016
See application file for complete search history.

(56) References Cited

U.S. PATENT DOCUMENTS

2009/0279705 A1    11/2009  Sun et al.
2010/0220656 A1*    9/2010  Ramankutty ......... H04L 45/025
                                                        370/328
(Continued)

FOREIGN PATENT DOCUMENTS

CN        101232368 A      7/2008
CN        101494538 A      7/2009
(Continued)

OTHER PUBLICATIONS

International Search Report issued in PCT/JP2017/016034 dated May 23, 2017 (3 pages).

(Continued)

*Primary Examiner* — Elton Williams
(74) *Attorney, Agent, or Firm* — Osha Bergman Watanabe & Burton LLP

(57) ABSTRACT

A switch is provided. The switch is connected to a control apparatus for controlling Lawful Interception, and relays packets transmitted and received between a user apparatus and an IMS apparatus in the home network of the user apparatus. The switch includes a determination unit configured to determine whether the user apparatus is a Lawful Interception target or whether the user apparatus is a roaming user; and a transmission unit configured to, in the case where the user apparatus is a Lawful Interception target or in the case where the user apparatus is a roaming user, transmit to a mobile management switch information indicating to the user apparatus that the user apparatus should (Continued)

transmit and receive the packets to and from the IMS apparatus without encryption.

3 Claims, 11 Drawing Sheets

(51) Int. Cl.
*H04W 12/033* (2021.01)
*H04W 12/037* (2021.01)
*H04W 80/10* (2009.01)
*H04W 84/04* (2009.01)
*H04L 29/06* (2006.01)

(52) U.S. Cl.
CPC ......... *H04W 12/02* (2013.01); *H04W 12/033* (2021.01); *H04W 12/037* (2021.01); *H04L 63/164* (2013.01); *H04W 80/10* (2013.01); *H04W 84/042* (2013.01)

(56) References Cited

U.S. PATENT DOCUMENTS

| | | | |
|---|---|---|---|
| 2011/0047256 A1* | 2/2011 | Babu | H04L 29/12367 709/223 |
| 2013/0265988 A1 | 10/2013 | Nishida et al. | |
| 2015/0016413 A1* | 1/2015 | Sirotkin | H04W 48/08 370/331 |
| 2016/0006713 A1 | 1/2016 | Holtmanns et al. | |
| 2016/0323178 A1* | 11/2016 | Hammer | H04L 63/306 |
| 2017/0064544 A1* | 3/2017 | Youn | H04W 8/12 |

FOREIGN PATENT DOCUMENTS

| | | |
|---|---|---|
| CN | 103155645 A | 6/2013 |
| CN | 105075182 A | 11/2015 |

OTHER PUBLICATIONS

Written Opinion of the International Searching Authority issued in PCT/JP2017/016034 dated May 23, 2017 (3 pages).

Kaneko, M. et al.; "VoLTE Roaming Service Using New VoLTE Roaming Architecture S8HR"; NTT DOCOMO Technical Journal, Technology Reports, vol. 17, No., Oct. 3, 2015, pp. 13-22 (19 pages) Internet URL:https://www.nttdocomo.co.jp/corporate/technology/rd/technical_journal/bn/vol23_3/004.html.

3GPP TS 33.203 V13.1.0; "3rd Generation Partnership Project; Technical Specification Group Services and System Aspects; 3G security; Access security for IP-based services (Release 13)"; Dec. 2015 (145 pages).

Office Action issued in the counterpart Chinese Patent Application No. 201780025040.3, dated May 26, 2021 (19 pages).

3GPP SA WG3-LI; "Reply to LS on VoLTE Roaming Architecture GSMA"; 3GPP TSG SA Meeting #68, TD SP-150192; Malmo, Sweden; Jun. 17-19, 2015 (3 pages).

Office Action in counterpart Chinese Patent Application No. 201780025040.3 dated Nov. 24, 2021 (16 pages).

"GSMA S8HR Technical Report Version 0.1"; GSM Association; Sep. 18, 2015 (20 pages).

* cited by examiner

FIG.4

Table 8.2.1.1: ATTACH ACCEPT message content

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach accept message identity | Message type 9.8 | M | V | 1 |
| | EPS attach result | EPS attach result 9.9.3.10 | M | V | 1/2 |
| | Spare half octet | Spare half octet 9.9.2.9 | M | V | 1/2 |
| | T3412 value | GPRS timer 9.9.3.16 | M | V | 1 |
| | TAI list | Tracking area identity list 9.9.3.33 | M | LV | 7-97 |
| | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |
| 6A | T3324 value | GPRS timer 2 9.9.3.16A | O | TLV | 3 |
| 6E | Extended DRX parameters | Extended DRX parameters 9.9.3.46 | O | TLV | 3 |
| xx | IMS encryption | | O | | |

| SERIAL UMBER | HEADER NAME | SETTING CONTENTS |
|---|---|---|
| 1 | REQUEST LINE | SET v6 ADDRESS (UE) VERSION NUMBER IS FIXED TO 2.0 |
| 2 | Authorization | SET PrivateUserID AS Digestusername NOTHING (BLANK) IS SET AS nonce NOTHING (BLANK) IS SET AS response |
| 3 | Call-ID | GENERATED AND SET BY UE |
| 4 | Contact | SET "INVITE, CANCEL, ACK, BYE, OPTIONS, NOTIFY, PRACK, UPDATE, MESSAGE" AS methods SET 3600 AS expires |
| 5 | Content-Length | SET "0" |
| 6 | CSeq | SET "1 REGISTER" |
| 7 | Require | SET "sec-agree" |
| 8 | proxy-Require: sec- | SET "sec-agree" |
| 9 | Supported | SET "path" |
| 10 | Max-Forwards | |
| 11 | Via | SET v6 ADDRESS (UE) |
| 12 | From | SET IMSI+DOMAIN |
| 13 | To | SET IMSI+DOMAIN |
| 14 | Security-Client | SET "ipsec-3gpp" AS mechanism-name Encrypt-algorithm: SET NULL Protocol: SET "esp" mode: SET "trans", etc. (IN ORDER TO ESTABLISH Security Association) SET "hmac-sha-1-96" AS Integrity algorithm(alg) PARAMETERS ARE SET IN spi-c AND spi-s AS SPI(Security Parameter Index) SETTING PARAMETERS ARE SET IN port-c AND port-s AS Port SETTING |

Table 8.3.6.1: ACTIVATE DEFAULT EPS BEARER CONTEXT REQUEST message content

| IEI | Information Element | Type/Reference | Presence | Format | Length |
|---|---|---|---|---|---|
| | Protocol discriminator | Protocol discriminator 9.2 | M | V | 1/2 |
| | EPS bearer identity | EPS bearer identity 9.3.2 | M | V | 1/2 |
| | Procedure transaction identity | Procedure transaction identity 9.4 | M | V | 1 |
| | Activate default EPS bearer context request message identity | Message type 9.8 | M | V | 1 |
| | EPS QoS | EPS quality of service 9.9.4.3 | M | LV | 2-14 |
| | Access point name | Access point name 9.9.4.1 | M | LV | 2-101 |
| | PDN address | PDN address 9.9.4.9 | M | LV | 6-14 |
| 5D | Transaction identifier | Transaction identifier 9.9.4.17 | O | TLV | 3-4 |
| 30 | Negotiated QoS | Quality of service 9.9.4.12 | O | TLV | 14-22 |
| 32 | Negotiated LLC SAPI | LLC service access point identifier 9.9.4.7 | O | TV | 2 |
| 8- | Radio priority | Radio priority 9.9.4.13 | O | TV | 1 |
| 34 | Packet flow Identifier | Packet flow Identifier 9.9.4.8 | O | TLV | 3 |
| 5E | APN-AMBR | APN aggregate maximum bit rate 9.9.4.2 | O | TLV | 4-8 |
| 58 | ESM cause | ESM cause 9.9.4.4 | O | TV | 2 |
| 27 | Protocol configuration options | Protocol configuration options 9.9.4.11 | O | TLV | 3-253 |
| B- | Connectivity type | Connectivity type 9.9.4.2A | O | TV | 1 |
| C- | WLAN offload indication | WLAN offload acceptability 9.9.4.18 | O | TV | 1 |
| 33 | NBIFOM container | NBIFOM container 9.9.4.19 | O | TLV | 3-257 |
| XX | IMS encryption | | O | | |

SWITCH AND COMMUNICATION METHOD

BACKGROUND OF THE INVENTION

1. Field of the Invention

The present invention relates to a switch and a communication method.

2. Description of the Related Art

In 3GPP, a technology called IMS (IP Multimedia Subsystem) is defined which realizes various services provided by a mobile communication network, a fixed network, etc., by using IP (Internet Protocol). The IMS is an independent system, which can be connected to various networks such as a mobile communication network and a fixed network. For example, VoLTE (Voice over LTE) is known as a service provided by having the IMS connected to an EPC (Evolved Packet Core).

In VoLTE, two types of roaming methods, an LBO (Local break Out) method and an S8HR (S8 Home Routed) method, are defined. In the LBO method, the roaming is performed by implementing a group of EPC apparatuses and a P-CSCF (Proxy-Call Session Control Function) in a VPLMN (Visited Public Land Mobile Network) and by implementing an S-CSCF (Serving-Call Session Control Function), etc., in an HPLMN (Home Public Land Mobile Network).

On the other hand, in the S8HR method, the roaming is performed by implementing only an SGW (Serving Gateway) in the VPLMN and by implementing a PGW (Packet data network Gateway), a P-CSCF and an S-CSCF in the HPLMN. In the S8HR method, a roaming terminal uses an IMS apparatus in the HPLMN, and thus, it is possible to realize VoLTE roaming without depending on the P-CSCF capability.

CITATION LIST

Non-Patent Literature

[NPL 1] "Development of international VoLTE roaming by using a new roaming model 'S8HR'", October, 2015, NTT DOCOMO, Internet <URL:https://www.nttdocomo.co.jp/corporate/technology/rd/technical/journal/bn/vol23_3/004.html>
[NPL 2] 3GPP TS33.203 V13.1.0 (2015-12)

SUMMARY OF THE INVENTION

Technical Problem

In VoLTE, it is defined that data transmitted and received between a user apparatus and a P-CSCF should be encrypted by using IPSec (NPL 2). Therefore, in the S8HR method, all of the data transmitted and received between the user apparatus and the P-CSCF is supposed to be encrypted in the visited network because the P-SCSF is in the home network (HPLMN). An example of a signaling sequence in the S8HR method is illustrated in FIG. 1. As illustrated in FIG. 1, an IMS bearer is established between a PGW apparatus in the home network and the user apparatus according to an attach procedure (S101-S106). Next, exchanging keys used for IPSec is performed in the first IMS registration process (S111-S114) by using the IMS bearer, and SIP messages transmitted and received in the second IMS registration process (S121-S124) and subsequent audio/video data (RTP packet, etc.) transmitted and received are encrypted by using IPSec.

Here, in the Lawful Interception (lawfully authorized interception) (LI), it is assumed that the interception is performed mainly in the visited network where the user apparatus resides. However, in the S8HR method, the VoLTE call is encrypted as described above, and thus, there is a problem in that the Lawful Interception cannot be performed in the visited network. In order to solve the above-described problem, it is necessary to provide a mechanism in which it is possible for the visited network side to operate to eliminate encrypted VoLTE communications. However, in the current 3GPP specifications, a mechanism in which such an operation is possible is not provided.

The present invention has been made in view of the above. It is an object of the present invention to provide a technique in which it is possible for the visited network side to operate to eliminate encrypted VoLTE communications in the case where VoLTE roaming according to the S8HR method is performed.

Solution to Problem

According to an embodiment, a switch is provided. The switch is connected to a control apparatus for controlling Lawful Interception, and relays packets transmitted and received between a user apparatus and an IMS apparatus in the home network of the user apparatus. The switch includes a determination unit configured to determine whether the user apparatus is a Lawful Interception target or whether the user apparatus is a roaming user; and a transmission unit configured to, in the case where the user apparatus is a Lawful Interception target or in the case where the user apparatus is a roaming user, transmit to a mobile management switch information indicating to the user apparatus that the user apparatus should transmit and receive to and from the IMS apparatus without encryption.

Advantageous Effects of Invention

According to an embodiment, a technique is provided in which it is possible for the visited network side to operate to eliminate encrypted VoLTE communications in the case where VoLTE roaming according to the S8HR method is performed.

BRIEF DESCRIPTION OF THE DRAWINGS

FIG. 4 is a drawing illustrating an example of an Attach Accept message.
FIG. 5 is a drawing illustrating an example of a SIP Register message.
FIG. 7 is a drawing illustrating an example of an EPS bearer Context Request message.

DETAILED DESCRIPTION OF THE PREFERRED EMBODIMENTS

Figure 1:
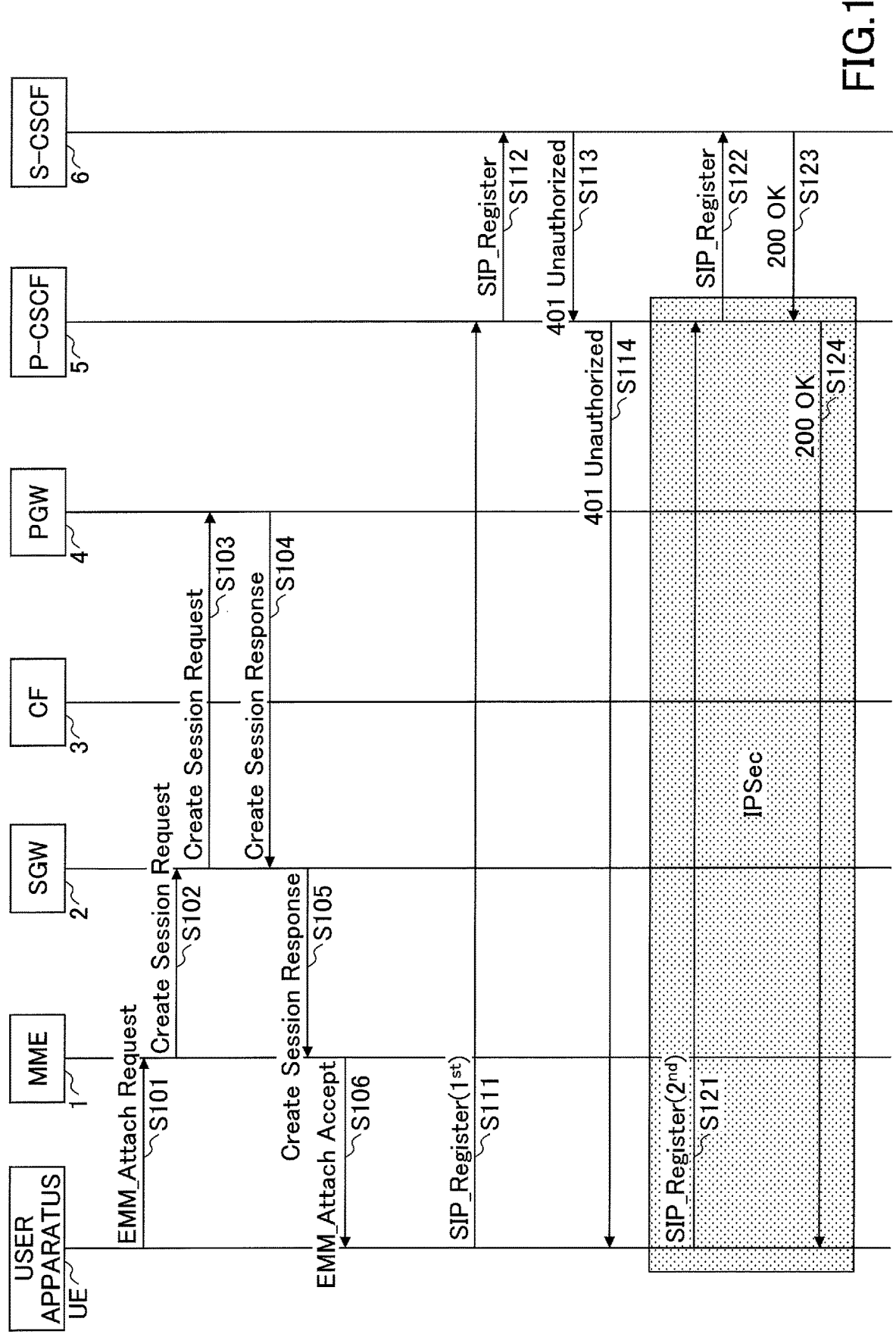
FIG. 1 is a drawing illustrating an example of a signaling sequence in the S8HR method.

In the following, referring to the drawings, embodiments of the present invention will be described. It should be noted that the embodiments described below are merely examples and the embodiments to which the present invention is applied are not limited to the following embodiments. For example, it is assumed that a wireless communication system according to an embodiment complies with, but not limited to, VoLTE. The present invention may be applied to other systems in which an IMS is used in other networks (2G, 3G, GPRS, Wi-Fi [registered trademark], WiMAX [registered trademark], a fixed IP network, etc.). It should be noted that, in the application specification and claims, the term "LTE" is used, not only for meaning a communication method corresponding to 3GPP release 8 or 9, but also for including a communication method corresponding to 3GPP release 10, 11, 12, 13, or a fifth generation communication method corresponding to release 14 or later.

System Configuration

Figure 2:
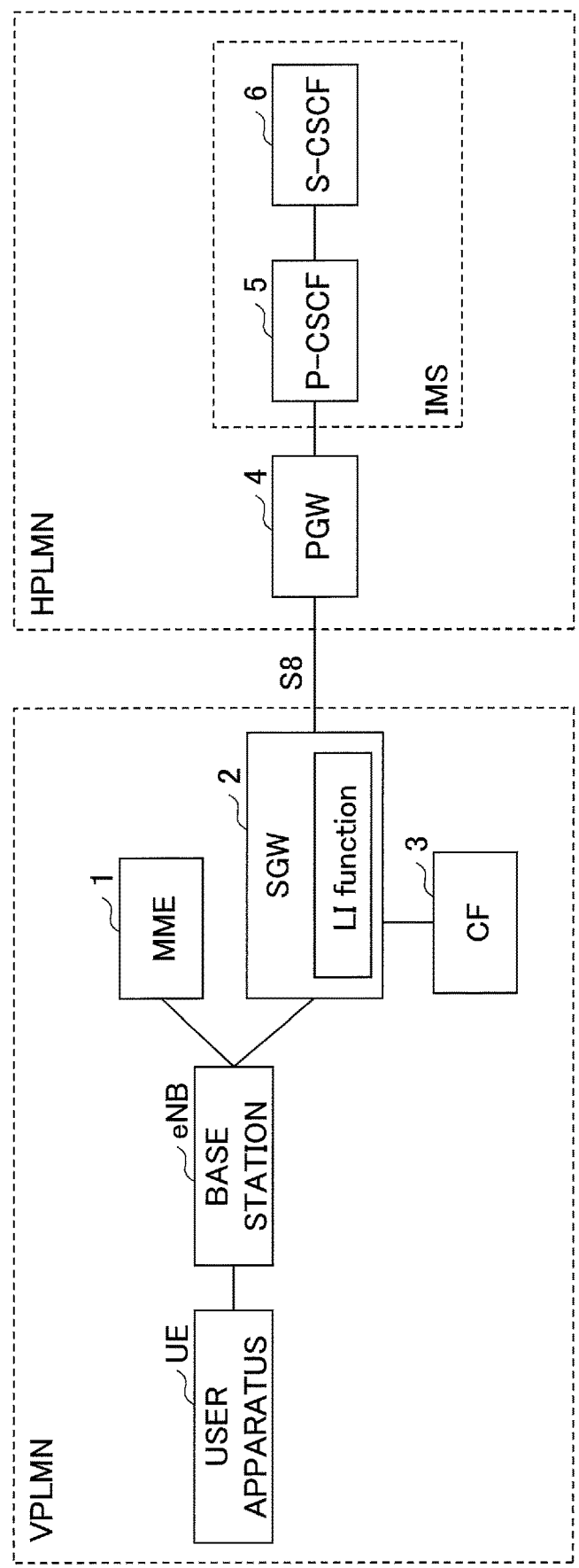
FIG. 2 is a drawing illustrating an example of a system configuration of a wireless communication system according to an embodiment.

FIG. 2 is a drawing illustrating an example of a system configuration of a wireless communication system according to an embodiment. As illustrated in FIG. 2, the wireless communication system includes a user apparatus UE, a base station eNB, an MME (Mobility Management Entity) 1, an SGW 2, a CF (Control Function) 3, a PGW 4, a P-CSCF 5, and an S-CSCF 6. The MME 1, the SGW 3 and the PGW 4 belong to the EPC. Further, the P-CSCF 5 and the S-CSCF 6 belong to the IMS. A reference point between the SGW 2 and the PGW 4 is referred to as an S8 reference point. According to an embodiment, it is assumed that the user apparatus UE, the base station eNB, the MME 1, the SGW 2, and the CF 3 are included in the visited network (VPLMN), and the PGW 4, the P-CSCF 5, and the S-CSCF 6 are included in the home network (HPLMN). Further, it is assumed that the user apparatus UE is a roaming terminal (that is, the user apparatus UE has roamed from the home network to the visited network) The wireless communication system illustrated in FIG. 2 includes only apparatuses necessary for realizing the VoLTE roaming according to the S8HR method. It is assumed that the wireless communication system include apparatuses for communications according to LTE and VoLTE (not shown). There are two types of control protocol options, a GTP (GPRS Tunneling Protocol) and a PMIP (Proxy Mobile IP), between the SGW 2 and the PGW 4. Any one of the GTP and the PMIP may be used.

The user apparatus UE has a function for communicating with apparatuses which belong to the EPC and the IMS, via the base station eNB. The user apparatus UE may be, for example, a mobile phone, a smartphone, a tablet, a mobile router, a personal computer, a wearable terminal, etc.

The base station eNB is a base station in LTE, and performs communications with the user apparatus UE through radio. Further, the base station eNB is connected to the MME 1 and the SGW 2, and relays a C-plane signal transmitted and received between the user apparatus UE and the MME 1, and a U-plane signal transmitted and received between the user apparatus UE and the SGW 2. The MME 1 is connected to the base station eNB and the SGW 2, and is an apparatus for providing a mobility control function and a bearer control function.

The SGW 2 is a visited network packet switch and relays a U-plane signal between the base station eNB and the PGW 4. Further, the SGW 2 has a Lawful Interception function (LI Function). The SGW 2 has a function for intercepting communications of an IMS call (also referred to as a VoLTE call, an IMS Voice, an MMTEL Voice, an MMTEL Video) by capturing packets transmitted and received between the user apparatus UE and the IMS in the home network. The CF 3 has a function for controlling the Lawful Interception function (LI Function) implemented in the SGW 2. For example, the CF 3 includes a function for starting/stopping the Lawful Interception function and a function for controlling the user apparatus UE as a Lawful Interception target.

The PGW 4 is a gateway apparatus for the EPC to connect to an external network (to the IMS in an example of FIG. 2) and provides an IP address to the user apparatus UE. The P-CSCF 5 is a SIP (Session Initiation Protocol) relay server located at a connection point to the EPC. Further, the P-CSCF 5 has, not only a function for relaying a SIP signal, but also a function for instructing the EPC to perform bearer control such as QoS setting and new bearer setting. The S-CSCF 6 is a SIP server including a function for controlling a session for the user apparatus UE and authenticating the user apparatus UE. It should be noted that, in the 3GPP specifications, it is also possible for the P-CSCF 5 to authenticate the user apparatus UE.

In the following, processing steps performed by a wireless communication system according to an embodiment will be described. The descriptions will be provided according to a first embodiment and a second embodiment.

First Embodiment

Processing Steps

Figure 3:
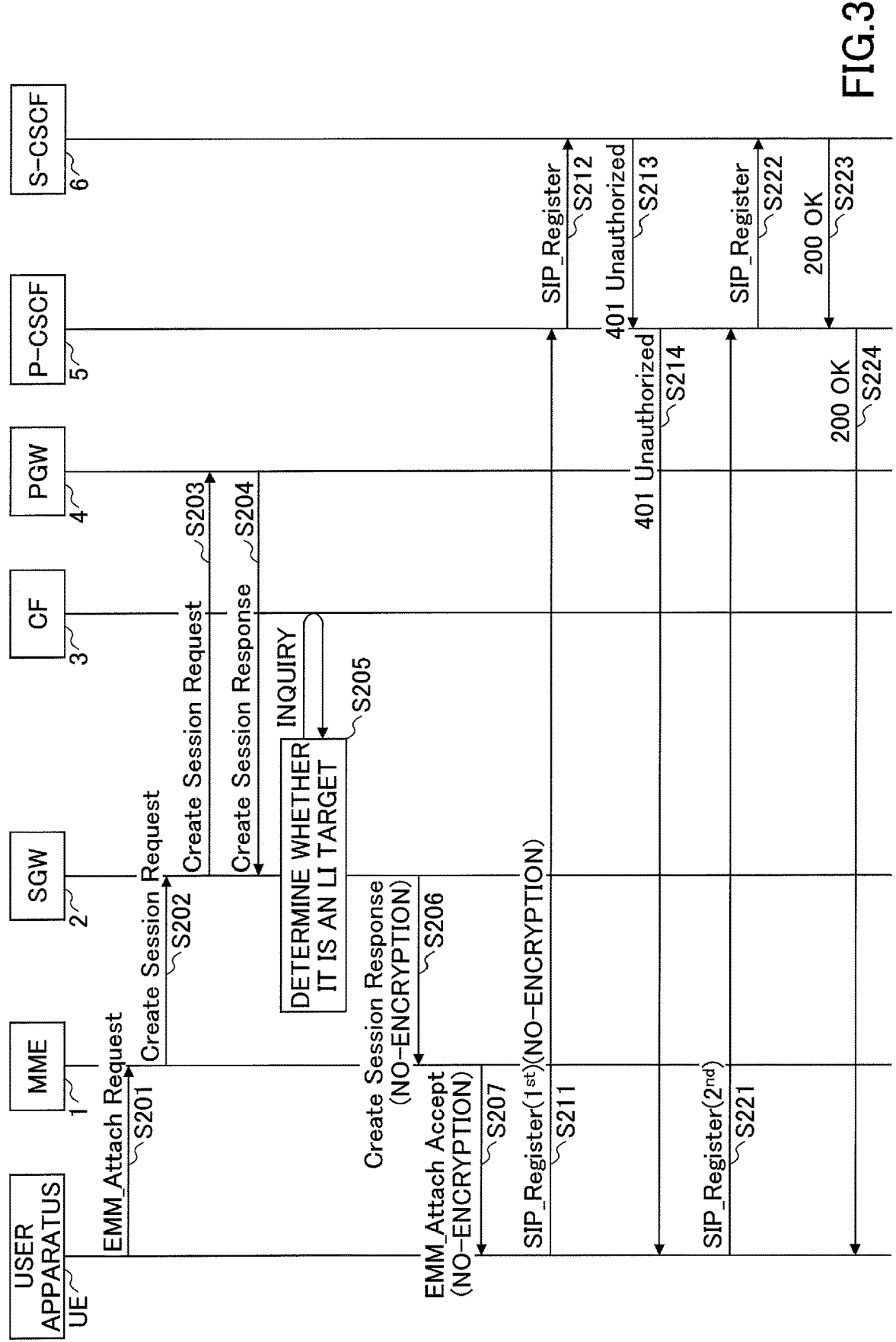
FIG. 3 is a sequence diagram illustrating an example of processing steps performed by a wireless communication system according to a first embodiment.

FIG. 3 is a sequence diagram illustrating an example of processing steps performed by a wireless communication system according to a first embodiment. Referring to FIG. 3, processing steps are described from IMS bearer establishment according to attachment, in which a roaming user apparatus UE is attached to the visited network, to the user apparatus UE registration in a home network IMS, in which the user apparatus UE is registered in the home network IMS. It should be noted that the IMS bearer means an EPS bearer whose APN (Access Point Name) is "ims" and can be used for communicating with the P-CSCF 5. Further, "the user apparatus UE is registered in the IMS" means a state in which the presence of the user apparatus UE is recognized by the IMS. After the IMS registration, it is possible for the user apparatus UE to perform communications in actuality.

First, the user apparatus UE transmits an Attach Request to the MME 1 in order to be attached to the visited network (S201). Next, the MME 1 transmits a Create Session Request to the SGW 2 in order to establish an IMS bearer between the user apparatus UE and the PGW 4 (S202).

Next, the SGW 2 transmits the Create Session Request to the PGW 4 to which the P-CSCF 5 is connected (S203). Next, the SGW 4 transmits a Create Session Response to the SGW 2 (S204).

Here, the SGW 2 determines whether the user apparatus UE is a Lawful Interception target (S205). More specifically, the SGW 2 determines whether the user apparatus UE is a Lawful Interception target by transmitting an identifier of the user apparatus UE (e.g., a user specific identifier including an IMSI, MSISDN) to the CF 3 and querying the CF 3 whether the user apparatus UE is a Lawful Interception target. It should be noted that, as another method for determining whether the user apparatus UE is a Lawful Interception target, the CF 3 may transmit a list of identifiers of Lawful Interception target user apparatuses UE to the SGW 2 in advance, and the SGW 2 may compare the identifier of the user apparatus UE with the list.

In the case where the user apparatus UE is a Lawful Interception target, the SGW 2 transmits a Create Session Response including "information indicating that packets transmitted and received to and from the IMS apparatus should not be encrypted" to the MME 1 (S206). Next, the MME 1 transmits to the user apparatus UE an Attach Accept including the "information indicating that packets transmitted and received to and from the IMS apparatus should not be encrypted" (S207). Here, an example of an Attach Accept message is illustrated in FIG. 4. An information element "IMS encryption" is an example of an information element indicating that packets transmitted and received to and from the IMS apparatus should not be encrypted.

As described above, according to processing steps from S201 to S207, an IMS bearer is established between the user apparatus UE and the PGW 4.

Next, the first time IMS registration processing (S211 to S214) is performed among the user apparatus UE, the P-CSCF and the S-CSCF. In the first time IMS registration processing, processes are performed for indicating/transmitting to the user apparatus UE a random number (RAND) and authentication information (AUTN: Authentication Token) used for performing AKA (Authentication and Key Agreement) authentication, and an exchange of IPSec SA (Security Association) is performed used for encrypting SIP messages transmitted and received in the second IMS registration processing. Here, in the case where it is indicated to the user apparatus UE that packets transmitted and received to and from the IMS apparatus should not be encrypted, the user apparatus UE includes "information indicating that encryption using IPSec is not performed" in a SIP Register message that the user apparatus UE transmits in the first IMS registration processing in transmission to the P-CSCF 5. FIG. 5 illustrates an example of the SIP Register message. In an example of FIG. 5, by setting "NULL" as "Encrypt-algorithm" of Security-Client, which is a part of a header in the SIP Register message, the user apparatus UE indicates to the P-CSCF 5 that the encryption according to IPSec is not performed.

Next, the second time IMS registration processing (S221 to S224) is performed among the user apparatus UE, the P-CSCF and the S-CSCF. In the second time IMS registration processing, authentication according to AKA authentication is performed, and the user apparatus UE whose authentication is successful is registered in the IMS. In an example of FIG. 3, the user apparatus UE indicates to the P-CSCF 5 that encryption according to IPSec is not performed, and thus, the second time IMS registration processing (S221 to S224) and subsequent transmission and reception of audio/video data (RTP packets, etc.) are performed without encryption according to IPSec.

In the above description, the processing steps from attachment, in which a roaming user apparatus UE is attached to the visited network, to registration in which the user apparatus UE is registered in the home network IMS, have been described. It should be noted that, in the processing steps from S206 and S207, the "information indicating that packets transmitted and received to and from the IMS apparatus should not be encrypted" may be either explicit information or implicit information. In the latter case, for example, the "information indicating that packets transmitted and received to and from the IMS apparatus should not be encrypted" may be the fact itself that information indicating that the packets should be encrypted is not set.

Modified Example 1

In an example of FIG. 3, it is assumed that the IMS bearer is established when the roaming user apparatus UE is attached to the visited network. The first embodiment can be also applied to a case in which the IMS bearer is separately established after the attachment.

Figure 6:
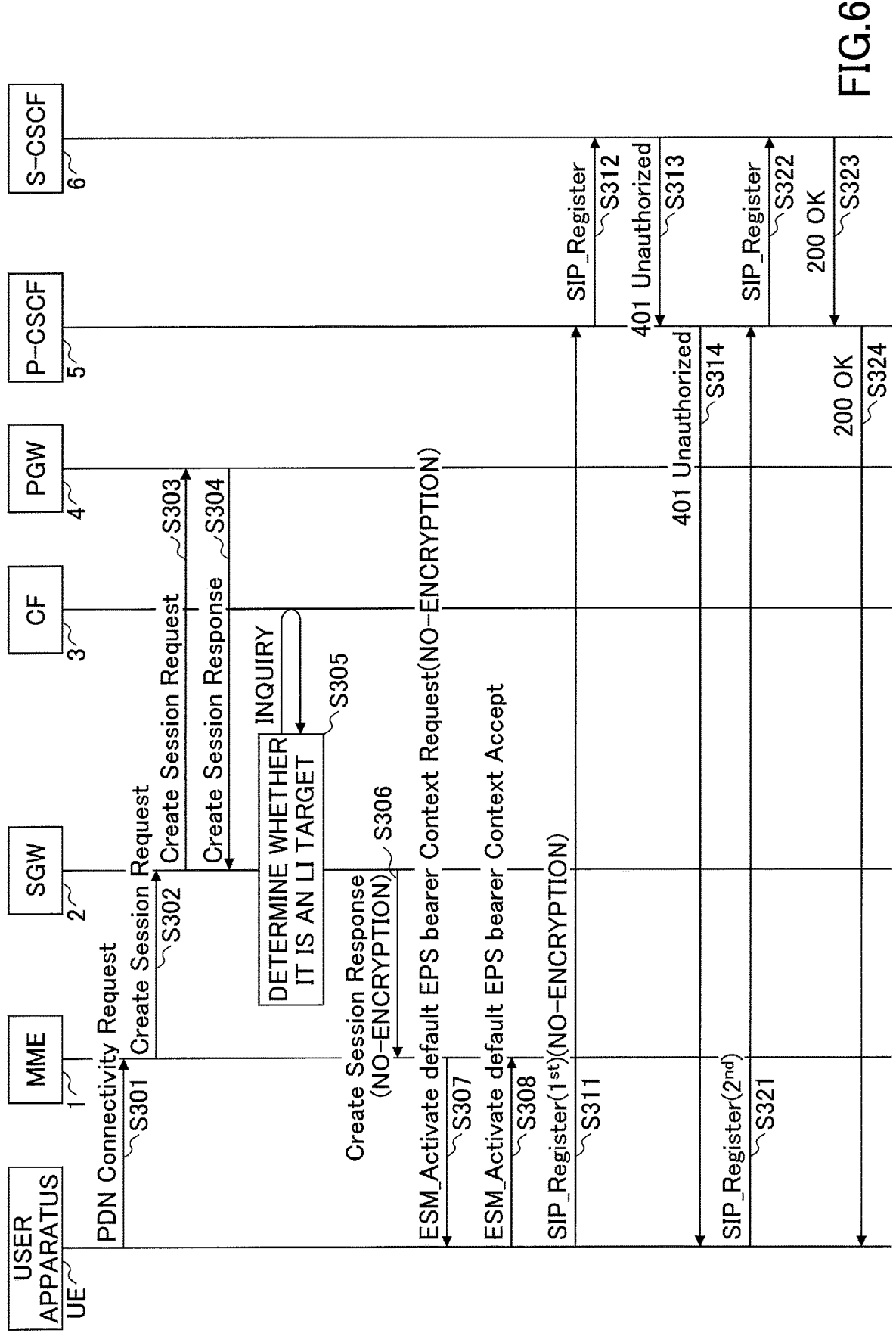
FIG. 6 is a sequence diagram illustrating an example of processing steps (modified example 1) performed by a wireless communication system according to the first embodiment.

FIG. 6 is a sequence diagram illustrating an example of processing steps (modified example 1) performed by a wireless communication system according to the first embodiment.

First, the user apparatus UE transmits a PDN Connectivity Request to the MME 1 in order to establish an IMS bearer (S301). The processing steps from S302 to S306 are the same as those from S202 to S206 in FIG. 3, and thus, the description will be omitted.

In the case where the user apparatus UE is a Lawful Interception target, the MME 1 transmits an Activate default EPS bearer Context Request including "information indicating that packets transmitted and received to and from the IMS apparatus should not be encrypted" to the user apparatus UE (S307). Here, an example of the Activate default EPS bearer Context Request message is illustrated in FIG. 7. An information element "IMS encryption" is an example of an information element indicating that packets transmitted and received to and from the IMS apparatus should not be encrypted. Next, the user apparatus UE transmits an Active default EPS bearer Context Accept to the MME 1 (S308).

It should be noted that, in the processing step S307, the "information indicating that packets transmitted and received to and from the IMS apparatus should not be encrypted" may be either explicit information or implicit information. In the latter case, for example, the "information indicating that packets transmitted and received to and from the IMS apparatus should not be encrypted" may be the fact itself that information indicating that the packets should be encrypted is not set.

The processing steps from S311 to S324 are the same as those from S211 to S224 in FIG. 3, and thus, the description will be omitted.

Modified Example 2

The SGW 2 may omit the processing step S205 (or S305) and, in the processing step S206 (or S306), may transmit to the MME 1 a Create Session Response including "information indicating that packets transmitted and received to and from the IMS apparatus should not be encrypted" in the case where the user apparatus UE is a roaming terminal. The SGW 2 may determine whether the user apparatus UE is a roaming terminal based on values of an MCC (Mobile Country Code) and an MNC (Mobile Network Code) included in an IMSI of the user apparatus UE. With the above arrangement, it is not necessary for the SGW 2 to determine whether the user apparatus UE is a Lawful Interception target, and thus, it is possible to reduce processing load of the SGW 2.

The first embodiment has been described above. According to the first embodiment, packets related to an IMS call are transmitted and received without encryption according to IPSec, and thus, it is possible for the SGW 2 to perform Lawful Interception for an S8HR method IMS call.

Second Embodiment

Next, a second embodiment will be described. According to the second embodiment, in the case where encryption according to IPSec is performed for packets transmitted and received between the user apparatus UE and the P-CSCF 5 (that is, in the case where packets transmitted and received via the IMS bearer are encrypted), the VoLTE call is disabled by forcibly disconnecting the IMS bearer.

Processing Steps

Figure 8:
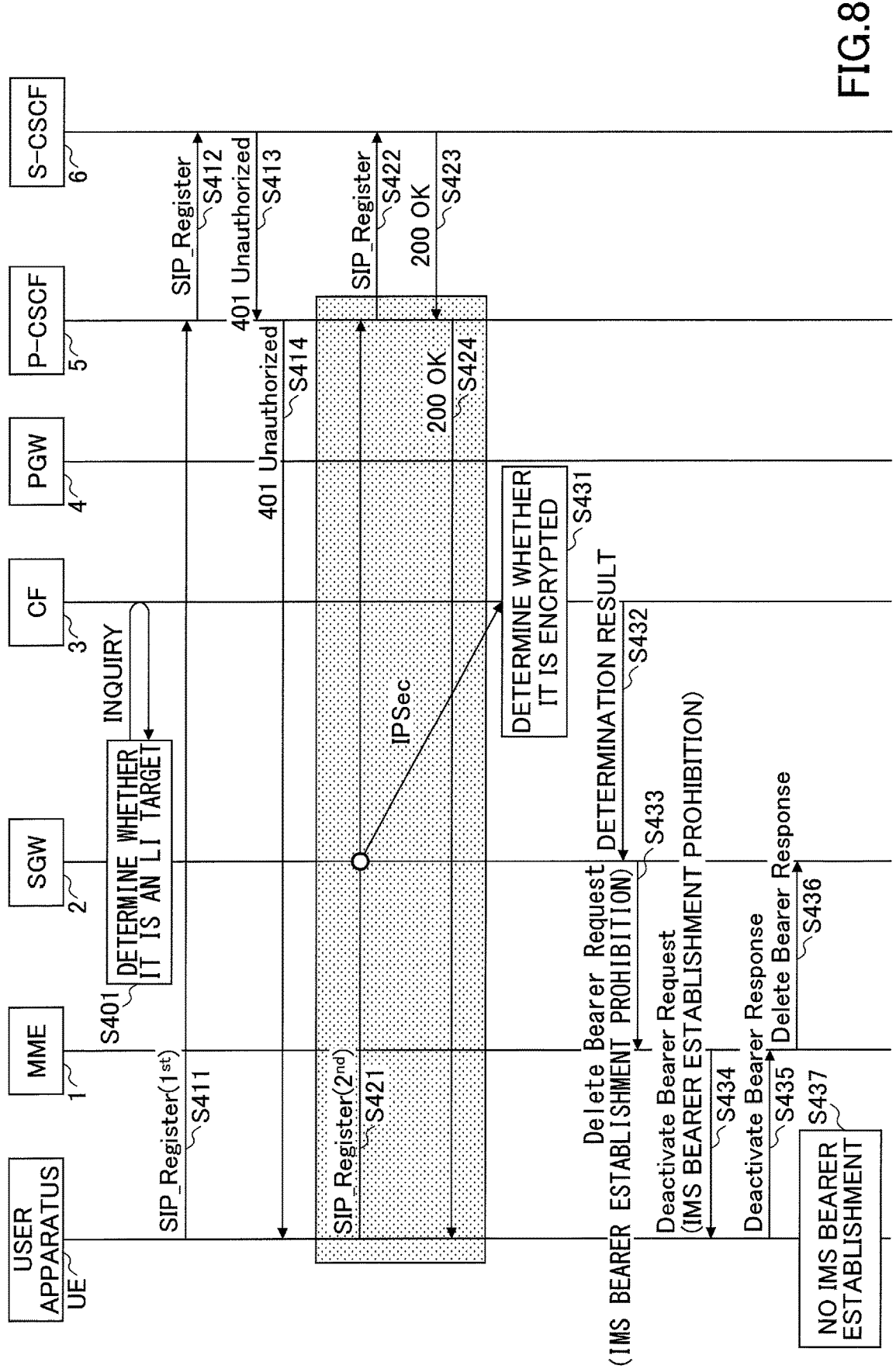
FIG. 8 is a sequence diagram illustrating an example of processing steps performed by a wireless communication system according to a second embodiment.

FIG. 8 is a sequence diagram illustrating an example of processing steps performed by a wireless communication system according to a second embodiment. It should be noted that, in FIG. 8, processing steps for establishing an IMS bearer between the user apparatus UE and the PGW 4 (processing steps corresponding to S201 to S204 and S206 to S207 in FIG. 3, S301 to S304 and S306 to S308 in FIG. 6) are omitted.

First, according to similar processing steps of the above-described step S205 (FIG. 3) or step S305 (FIG. 6), the SGW 2 determines whether the user apparatus UE establishing an IMS bearer is a Lawful Interception target (S401). Here, it is assumed that the user apparatus UE is a Lawful Interception target.

Next, the first IMS registration processing (S411 to S414) and the second IMS registration processing (S421 to S424) are performed among the user apparatus UE, the P-CSCF and the S-CSCF. In an example of FIG. 8, it is assumed that packets related to the second IMS registration processing are encrypted according to IPSec.

Here, because the user apparatus UE is a Lawful Interception target, the SGW2 determines whether packets (SIP Register) transmitted in the processing step S421 are encrypted. For example, the SGW 2 may capture the packets, transmit the captured packets to the CF 3, and cause the CF 3 to determine whether the packets are encrypted (S431), or the SGW 2 may determine by itself whether the packets are encrypted. In the former case, the CF 3 indicates/transmits a determination result to the SGW 2 (S432). It should be noted that the indication may be a message indicating whether the packets are encrypted, or may be a message indicating the SGW 2 to disconnect the IMS bearer.

Next, in order to disconnect the IMS bearer established between the user apparatus UE and the PGW 4, the SGW 2 transmits a Delete Bearer Request message to the MME 1 (S433). Here, the SGW 2 includes "information indicating prohibition of IMS bearer establishment" to the user apparatus UE in the Delete Bearer Request message. Next, the MME 1 transmits a Deactivate Bearer Request message including the "information indicating prohibition of IMS bearer establishment" to the user apparatus UE (S434).

The "information indicating prohibition of IMS bearer establishment" may be, for example, information in which information (or a Cause value), which indicates prohibition of transmission of a PDN Connectivity Request (that is, PDN Connectivity Request for establishing a bearer directed to the IMS apparatus) specifying the same PDN as the disconnected PDN until a back off timer expires, and a back off timer value, whose timer value is set to infinite, are combined. Further, considering a possibility that the back off timer value may be overwritten with a finite value, in addition to the above combination, information (or a Cause value) which indicates prohibition of transmission of a PDN Connectivity Request (that is, PDN Connectivity Request for establishing a bearer directed to the IMS apparatus) specifying the same PDN as the disconnected PDN as long as the user apparatus UE is in the same PLMN may be added. Further, as another example, the "information indicating prohibition of IMS bearer establishment" may be simply information (or a Cause value) which indicates prohibition of transmission of a PDN Connectivity Request (that is, PDN Connectivity Request for establishing a bearer directed to the IMS apparatus) specifying the same PDN as the disconnected PDN as long as the user apparatus UE is in the same PLMN. It should be noted that the PDN Connectivity Request for establishing a bearer directed to the IMS apparatus includes any one of a PDN Connectivity Request in which "ims" is set as APN and a PDN Connectivity Request in which "ims" is not set as APN in the case where the default value of APN is "ims".

Next, the user apparatus UE disconnects the IMS bearer and transmits a Deactivate Bearer Response to the MME 1 (S435). Next, the MME 1 transmits the Deactivate Bearer Response to the SGW 2 (S436). Thereafter, the user apparatus UE operates not to establish an IMS bearer while the user apparatus UE is in the same PLMN (S437).

Modified Example

The SGW 2 may omit processing step S401, and determine whether packets (SIP Register) transmitted in processing step S421 are encrypted in the case where the user apparatus UE is a roaming terminal. The SGW 2 may determine whether the user apparatus UE is a roaming terminal based on values of an MCC (Mobile Country Code) and an MNC (Mobile Network Code) included in an IMSI of the user apparatus UE. With the above arrangement, it is not necessary for the SGW 2 to determine whether the user apparatus UE is a Lawful Interception target, and thus, it is possible to reduce processing load of the SGW 2.

The second embodiment has been described above. According to the second embodiment, it is possible to disable encrypted VoLTE communications, for which Lawful Interception cannot be performed, by the user apparatus UE which is a Lawful Interception target. It should be noted that there is a possibility that the user apparatus UE may switch to a CS line to perform communications. However, the CS line is processed by a switch in the visited network, and thus, it is possible for the visited network side to intercept communications.

The second embodiment may be combined with the first embodiment. In other words, in the case where the user apparatus UE ignores the indication according to the processing steps described in the first embodiment, the encrypted VoLTE communications may be disabled by forcibly disconnecting the IMS bearer.

Supplementary Descriptions Related to the First Embodiment and the Second Embodiment According to the first embodiment and the second embodiment, it is assumed that S8HR method VoLTE roaming is supported and that the Lawful Interception is performed for the S8HR-method roaming user apparatus. The first embodiment and the second embodiment can be also applied to a case in which the Lawful Interception is performed for the user apparatus in the home network. For example, in the case where the user apparatus UE in the home network is a Lawful Interception target, the SGW 2 according to the first embodiment may transmit to the user apparatus UE "information indicating that packets transmitted and received to and from the IMS apparatus should not be encrypted" via the MME 1. With the above arrangement, the user apparatus UE in the home network performs communications without encryption according to IPSec, and thus, it is possible for the SGW 2 to perform Lawful Interception of an IMS call.

Further, for example, in the case where the user apparatus UE in the home network is a Lawful Interception target and packets transmitted and received via the IMS bearer are encrypted, the SGW 2 according to the second embodiment may disconnect the IMS bearer of the user apparatus UE and transmit to the user apparatus UE the "information indicating prohibition of IMS bearer establishment" via the MME 1. With the above arrangement, encrypted VoLTE communications are disabled for the user apparatus UE in the home network.

Functional Structure

In the following, functional structure examples of the CF 3, the SGW 2, the MME 1 and the user apparatus UE which perform operations according to an embodiment will be described.

CF

Figure 9:
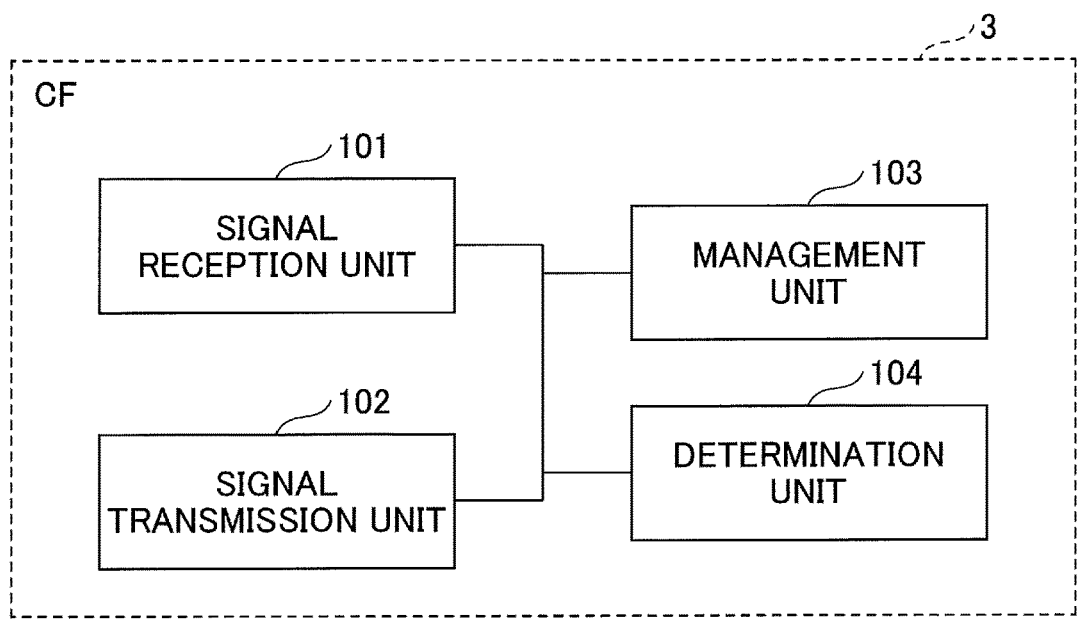
FIG. 9 is a drawing illustrating an example of a functional structure of a CF according to an embodiment.

FIG. 9 is a drawing illustrating an example of a functional structure of a CF 3 according to an embodiment. As illustrated in FIG. 9, the CF 3 includes a signal reception unit 101, a signal transmission unit 102, a management unit 103, and a determination unit 104. FIG. 9 illustrates only functional units in the CF 3 especially related to an embodiment. the CF 3 also includes at least functions for performing operations according to LTE (including 5G) (not shown in the figure). Further, a functional structure illustrated in FIG. 9 is merely an example. Any functional classification and any names of functional units may be used as long as operations related to an embodiment can be performed. It should be noted that a part of the above-described processing of the CF 3 (e.g., any one of the first embodiment and the second embodiment, only a specific modified example, or multiple modified examples, etc.) may be performed.

The signal reception unit 101 and the signal transmission unit 102 have a function for performing transmission and reception of various types of signals (messages) with the SGW 2. The management unit 103 includes a function for controlling identifiers of Lawful Interception target user apparatuses UE. Further, the management unit 103 may indicate (transmit) a list of identifiers of Lawful Interception target user apparatuses UE to the SGW 2 via the signal transmission unit 102. The determination unit 104 has a function for determining whether packets received from the SGW 2 are encrypted.

SGW

Figure 10:
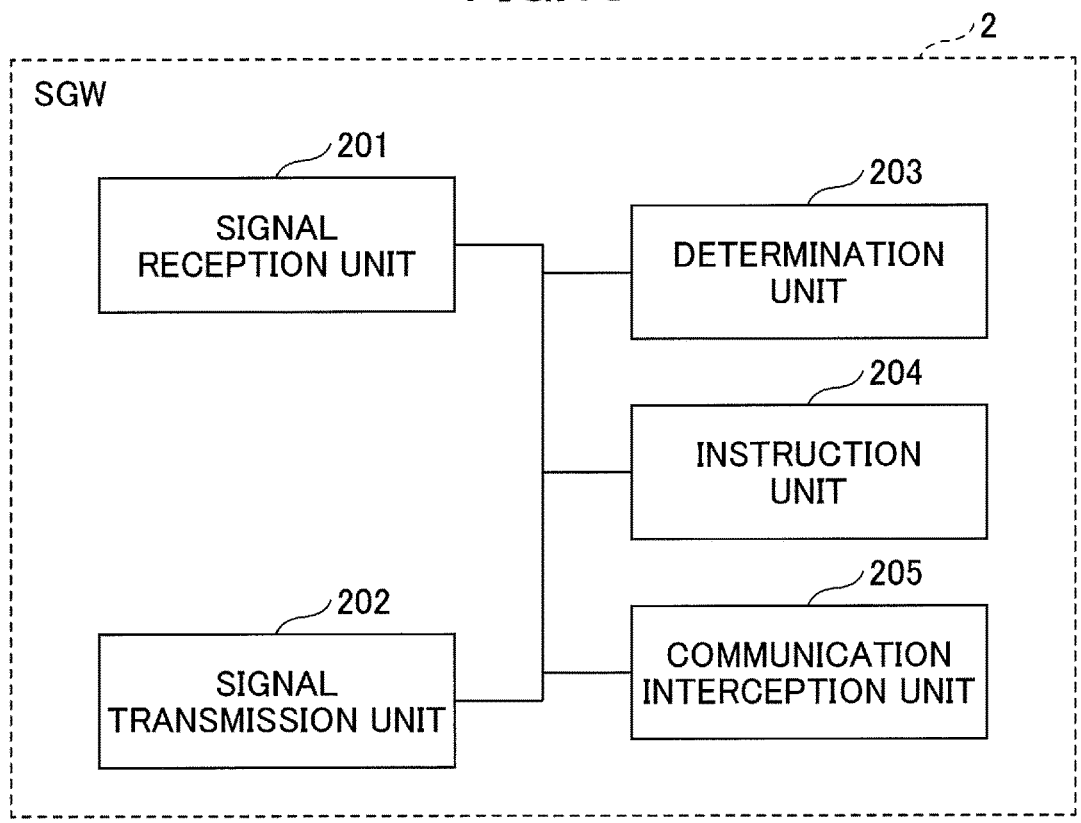
FIG. 10 is a drawing illustrating an example of a functional structure of an SGW according to an embodiment.

FIG. 10 is a drawing illustrating an example of a functional structure of a SGW 2 according to an embodiment. As illustrated in FIG. 10, the SGW 2 includes a signal reception unit 201, a signal transmission unit 202, a determination unit 203, an indication unit 204, and a communication interception unit 205. FIG. 10 illustrates only functional units in the SGW 2 especially related to an embodiment. the SGW 2 also includes at least functions for performing operations according to LTE (including 5G) (not shown in the figure). Further, a functional structure illustrated in FIG. 10 is merely an example. Any functional classification and any names of functional units may be used as long as operations related to an embodiment can be performed. It should be noted that a part of the above-described processing of the SGW 2 (e.g., any one of the first embodiment and the second embodiment, only a specific modified example, or multiple modified examples, etc.) may be performed.

The signal reception unit 201 and the signal transmission unit 202 have a function for performing transmission and reception of various types of signals (messages) with the base station eNB, the MME 1, the CF 3, and the PGW 4.

The determination unit 203 has a function for determining whether the user apparatus UE is a Lawful Interception target or whether the user apparatus UE is a roaming user. Further, the determination unit 203 may determine whether the bearer established by the user apparatus UE is an IMS bearer and whether the user apparatus UE is a Lawful Interception target (or whether the user apparatus UE is a roaming user). It should be noted that the determination unit 203 may determine whether the user apparatus UE is a Lawful Interception target by querying the CF 3.

Further, the determination unit 203 has a function for determining whether a message transmitted by the user apparatus UE via the IMS bearer is encrypted. It should be noted that the determination unit 203 may determine whether a message transmitted by the user apparatus UE is encrypted by querying the CF 3.

The indication unit 204 has a function for transmitting information indicating that the user apparatus UE should transmit and receive packets to and from the IMS apparatus without encryption ("information indicating that packets transmitted and received to and from the IMS apparatus should not be encrypted") to the MME 1 via the signal transmission unit 202 in the case where the user apparatus UE is a Lawful Interception target or a roaming user. It should be noted that the indication unit 204 may transmit the information indicating that the packets should be transmitted and received to and from the IMS apparatus without encryption to the MME 1 via the signal transmission unit 202 in the case where the bearer established by the user apparatus UE is an IMS bearer and the user apparatus UE is a Lawful Interception target (or a roaming user).

Further, the indication unit 204 has a function for including information indicating prohibition of bearer establishment toward the IMS apparatus (information indicating prohibition of IMS bearer establishment) to the user apparatus UE in a message indicating disconnection of the bearer directed to the IMS apparatus (a message indicating that the IMS bearer should be disconnected) in transmission to the MME 1 via the signal transmission unit 202. It should be noted that, in the information indicating prohibition of establishment of the bearer toward the IMS apparatus, information indicating prohibition of transmission of a PDN Connectivity Request for specifying the same PDN as the disconnected PDN (for establishing a bearer directed to the IMS apparatus) while the user apparatus UE is in the same PLMN may be included.

The communication interception unit 205 has a function for intercepting packets transmitted and received via the IMS bearer of the Lawful Interception target user apparatus UE. The communication interception unit 205 may capture the packets transmitted and received via the IMS bearer of the Lawful Interception target user apparatus UE, and transmit the captured packets to the CF 3 via the signal transmission unit 202.

MME

Figure 11:
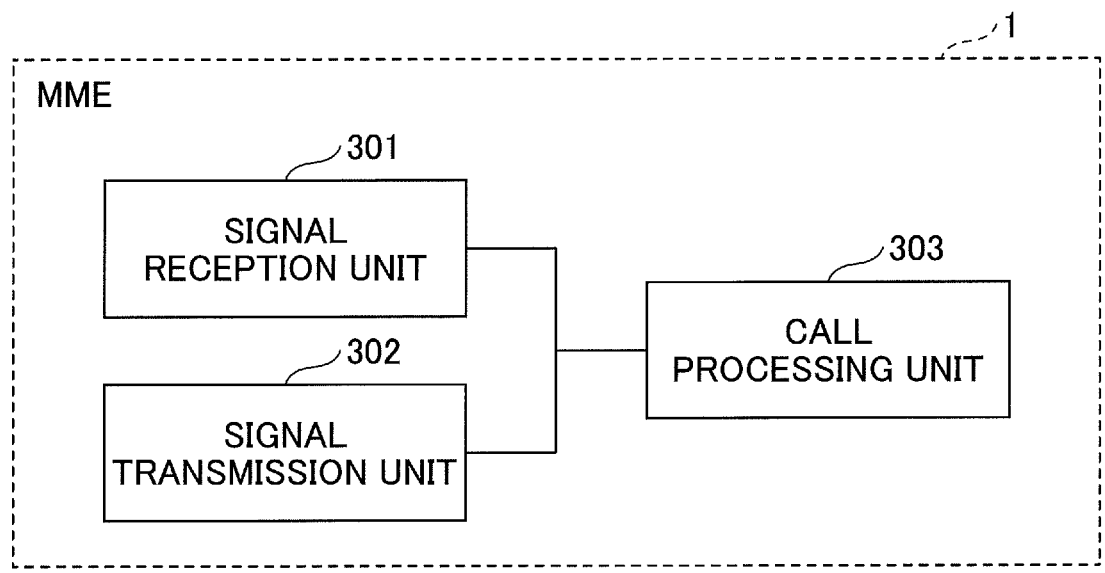
FIG. 11 is a drawing illustrating an example of a functional structure of an MME according to an embodiment.

FIG. 11 is a drawing illustrating an example of a functional structure of an MME 1 according to an embodiment. As illustrated in FIG. 11, the MME 1 includes a signal reception unit 301, a signal transmission unit 302, and a call processing unit 303. FIG. 11 illustrates only functional units in the MME 1 especially related to an embodiment. The MME 1 also includes at least functions for performing operations according to LTE (including 5G) (not shown in the figure). Further, a functional structure illustrated in FIG. 11 is merely an example. Any functional classification and any names of functional units may be used as long as operations related to an embodiment can be performed. It should be noted that a part of the above-described processing of the MME 1 (e.g., any one of the first embodiment and the second embodiment, only a specific modified example, or multiple modified examples, etc.) may be performed.

The signal reception unit 301 and the signal transmission unit 302 have a function for performing transmission and reception of various types of signals (messages) to and from the user apparatus UE, the base station eNB, and the SGW 2. The call processing unit 303 has a function for performing various types of call processing including attach processing and EPS bearer establishment. Further, the call processing unit 303 has a function for receiving from the SGW 2 a Create Session Response including information indicating to the user apparatus UE that the packets should be transmitted and received to and from the IMS apparatus without encryption, and for transmitting to the user apparatus UE via the signal transmission unit 302 an Attach Accept or an Activate default EPS bearer Context Request including information indicating to the user apparatus UE that the packets should be transmitted and received to and from the IMS apparatus without encryption.

Further, the call processing unit 303 has a function for receiving from the SGW 2 a Delete Bearer Request message including information indicating prohibition of IMS bearer establishment to the user apparatus UE, and for transmitting to the user apparatus UE a Deactivate Bearer Request message including the information indicating prohibition of IMS bearer establishment to the user apparatus UE.

User Apparatus

Figure 12:
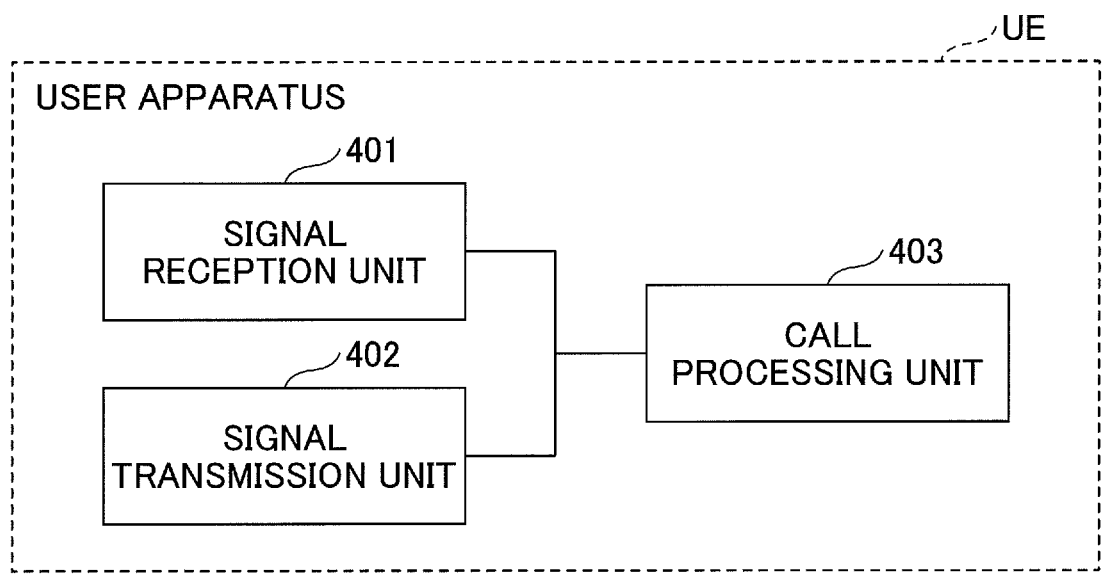
FIG. 12 is a drawing illustrating an example of a functional structure of a user apparatus according to an embodiment.

FIG. 12 is a drawing illustrating an example of a functional structure of a user apparatus UE according to an embodiment. As illustrated in FIG. 12, the user apparatus UE includes a signal reception unit 401, a signal transmission unit 402, and a call processing unit 403. FIG. 12 illustrates functional units of the user apparatus UE especially related to an embodiment only, and thus, the user apparatus UE further includes at least functions for performing operations according to LTE (including 5G) (not shown in the figure). Further, a functional structure illustrated in FIG. 12 is merely an example. Any functional classification and any names of functional units may be used as long as operations related to an embodiment can be performed. It should be noted that a part of the above-described processing of the user apparatus UE (e.g., any one of the first embodiment and the second embodiment, only a specific modified example, or multiple modified examples, etc.) may be performed.

The signal reception unit 401 and the signal transmission unit 402 have a function for performing transmission and reception of various types of signals (messages) with the base station eNB, the MME 1, the SGW 2, and the P-CSCF 5.

The call processing unit 403 has a function for transmission and reception of various types of SIP messages for attach processing, EPS bearer establishment, and IMS call establishment. Further, in the case where the information, which indicates to the user apparatus UE that the packets should be transmitted and received to and from the IMS apparatus without encryption, is received from the MME 1, the call processing unit 403 includes information indicating that the encryption according to IPSec is not performed in a SIP Register message transmitted in the first IMS registration processing, and transmits the included result to the P-CSCF 5.

Further, in the case where a Deactivate Bearer Request, which includes the information indicating prohibition of IMS bearer establishment to the user apparatus UE, is received from the MME 1, the call processing unit 403 disconnects the IMS bearer and does not re-establish the IMS bearer.

Further, in the case where the information from the MME 1 indicating prohibition of IMS bearer establishment to the user apparatus UE includes information, which indicates prohibition of transmission of a PDN Connectivity Request (for establishing a bearer directed to the IMS apparatus) specifying the same PDN as the disconnected PDN until the back off timer expires, combined with a back off timer value, the call processing unit 403 may not need to establish an IMS bearer until the back off timer expires. It should be noted that, in the case where infinity is set as the back off timer, the call processing unit 403 does not establish an IMS bearer while the user apparatus UE is in the same PLMN.

Further, in the case where the information from the MME 1 indicating prohibition of IMS bearer establishment to the user apparatus UE includes information indicating prohibition of transmission of a PDN Connectivity Request (for establishing a bearer directed to the IMS apparatus) specifying the same PDN as the disconnected PDN as long as the user apparatus UE is in the same PLMN, the call processing unit 403 does not establish an IMS bearer while the user apparatus UE is in the same PLMN.

Hardware Configuration

Block diagrams (FIG. 9 to FIG. 12) used for describing an embodiment indicate functional unit blocks. These functional blocks (functional units) are realized by a freely-selected combination of hardware and/or software. Further, realizing means of the functional blocks is not specifically limited. In other words, each functional block may be realized by a physically and/or logically coupled single apparatus, or may be realized by multiple apparatuses which are physically and/or logically separated and directly and/or indirectly connected (for example, with a wire and/or wirelessly).

Figure 13:
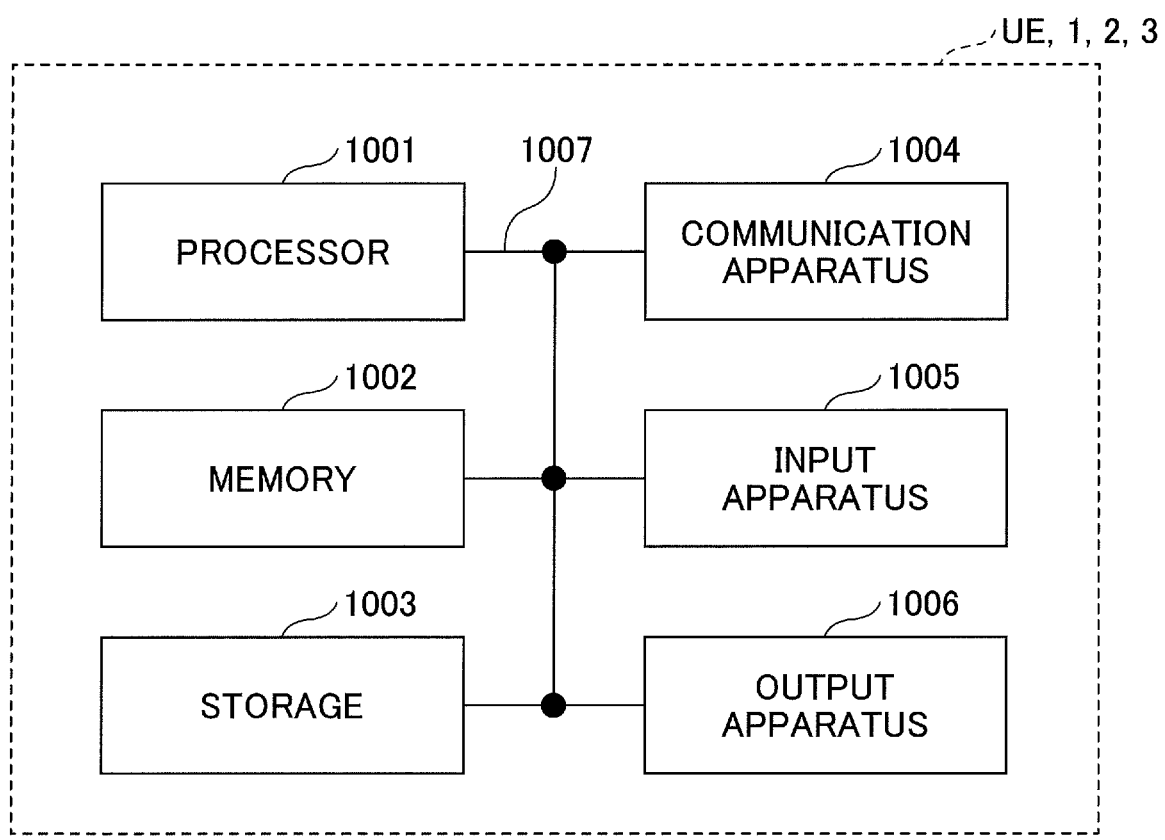
FIG. 13 is a drawing illustrating examples of hardware configurations of a user apparatus, an MME, an SGW, and a CF according to an embodiment.

For example, the user apparatus UE, the MME 1, the SGW 2, and the CF 3 according to an embodiment may be realized as computers performing processes of a communication method of the present invention. FIG. 13 is a drawing illustrating examples of hardware configurations of a user apparatus UE, an MME 1, an SGW 2, and a CF 3 according to an embodiment. The above-described user apparatus UE, the MME 1, the SGW 2, and the CF 3 may be physically realized by computer apparatuses including a processor 1001, a memory 1002, a storage 1003, a communication apparatus 1004, an input apparatus 1005, an output apparatus 1006, and a bus 1007.

It should be noted that the term "apparatus" in the following description may be read as a circuit, a device, a unit, etc. The hardware configurations of the user apparatus UE, the MME 1, the SGW 2, and the CF 3 may be realized by including one or more apparatuses illustrated in the drawing, or may be realized by not including some of the apparatuses.

Functions of the user apparatus UE, the MME 1, the SGW 2, and the CF 3 are realized by having predetermined software (program) read into hardware such as the memory 1002, by having the processor 1001 perform calculation, and by having the processor 1001 control communications by the communication apparatus 1004 and data reading and writing to and from the memory 1002 and the storage 1003.

The processor 1001 controls the entire computer by, for example, using the operating system. The processor 1001 may be a Central Processing Unit (CPU) including an interface with a peripheral apparatus, a control apparatus, a calculation apparatus, and a register. For example, the signal reception unit 101, the signal transmission unit 102, the management unit 103 and the determination unit 104 of the CF 3; the signal reception unit 201, the signal transmission unit 202, the determination unit 203, the indication unit 204, and the communication interception unit 205 of the SGW 2; the signal reception unit 301, the signal transmission unit 302, and the call processing unit 303 of the MME 1; and the signal reception unit 401, the signal transmission unit 402, and the call processing unit 403 of the user apparatus UE may be realized by the processor 1001.

Further, the processor 1001 reads programs (program codes), software modules, or data from the storage 1003 and/or the communication apparatus 1004 into the memory 1002, and performs various processes according to the read programs, software modules, or data. The programs are used for causing the computer to perform at least a part of the operations described in an embodiment. For example, the signal reception unit 101, the signal transmission unit 102, the management unit 103 and the determination unit 104 of the CF 3; the signal reception unit 201, the signal transmission unit 202, the determination unit 203, the indication unit 204, and the communication interception unit 205 of the SGW 2; the signal reception unit 301, the signal transmission unit 302, and the call processing unit 303 of the MME 1; and the signal reception unit 401, the signal transmission unit 402, and the call processing unit 403 of the user apparatus UE may be realized by control programs stored in the memory 1002 and executed by the processor 1001. Other functional blocks may be realized in the similar way. The above processes are described as performed by a single processor 1001. However, the processes may be performed simultaneously or sequentially by two or more processors 1001. The processor 1001 may be implemented by one or more chips. It should be noted that the programs may be transmitted from a network via telecommunication lines.

The memory 1002 is a computer-readable recording medium, and may include, for example, at least one of a Read Only Memory (ROM), an Erasable Programmable ROM (EPROM), an Electrically Erasable Programmable ROM (EEPROM), and a Random Access Memory (RAM). The memory 1002 may be referred to as a register, a cache, a main memory, etc. The memory 1002 can store programs (program codes), software modules, etc., executable for performing communication methods according to an embodiment.

The storage 1003 is a computer-readable recording medium, and may include at least one of an optical disk including a Compact Disc ROM (CD-ROM), a hard disk drive, a flexible disk, a magneto optical disk (e.g., a compact disk, a digital versatile disk, a Blu-ray (registered trademark) disk), a smart card, a flash memory (e.g., a card, a stick, a key drive), a floppy (registered trademark) disk, a magnetic strip, etc. The storage 1003 may be referred to as an auxiliary storage apparatus. The above-described recording medium may be a database, a server, or any other appropriate medium including the memory 1002 and/or the storage 1003.

The communication apparatus 1004 is hardware (transmitting and receiving device) for performing communications between computers via a wired network and/or a wireless network, and may be referred to as, for example, a network device, a network controller, a network card, a communication module, etc. For example, the signal reception unit 101 and the signal transmission 102 of the CF 3, the signal reception unit 201 and the signal transmission 202 of the SGW 2, the signal reception unit 301 and the signal transmission 302 of the MME 1, and the signal reception unit 401 and the signal transmission 402 of the user apparatus UE may be realized by the communication apparatus 1004.

The input apparatus 1005 is an input device (e.g., a keyboard, a mouse, a microphone, a switch, a button, and a sensor) used for accepting an input from outside. The output apparatus 1006 is an output device (e.g., a display, a speaker, an LED lamp) used for performing an output to outside. It should be noted that the input apparatus 1005 and the output apparatus 1006 may be integrated as a single apparatus (e.g., a touch panel).

Further, apparatuses including the processor 1001 and the memory 1002 are connected to each other by the bus 1007 used for communicating information. The bus 1007 may be a single bus, or may be buses different among the apparatuses.

Further, the user apparatus UE, the MME 1, the SGW 2, and the CF 3 may include hardware such as a microprocessor, a Digital Signal Processor (DSP), an ASIC (Application Specific Integrated Circuit), a PLD (Programmable Logic Device), and a FPGA (Field Programmable Gate Array). A part or all of the functional blocks may be realized by the above hardware. For example, the processor 1001 may be implemented by at least one of the above hardware.

Summary

According to an embodiment, a switch is provided. The switch is connected to a control apparatus for controlling Lawful Interception and relays packets transmitted and received between a user apparatus and an IMS apparatus in the home network of the user apparatus. The switch includes a determination unit configured to determine whether the user apparatus is a Lawful Interception target or whether the user apparatus is a roaming user; and a transmission unit configured to, in the case where the user apparatus is a Lawful Interception target or in the case where the user apparatus is a roaming user, transmit to a mobile management switch information indicating to the user apparatus that the user apparatus should transmit and receive the packets to and from the IMS apparatus without encryption. According to the switch, a technique is provided in which it is possible for the visited network side to operate to eliminate encrypted VoLTE communications in the case where the S8HR method VoLTE roaming is performed.

Further, the determination unit may determine whether the user apparatus is a Lawful Interception target by querying the control apparatus. With the above arrangement, it is possible to rely on the CF 3 with respect to determining whether the user apparatus UE is a Lawful Interception target.

Further, according to an embodiment, a switch is provided. The switch is connected to a control apparatus for controlling Lawful Interception and relays packets transmitted and received between a user apparatus and an IMS apparatus in the home network of the user apparatus. The switch includes a determination unit configured to determine whether packets transmitted from the user apparatus in a bearer directed to the IMS apparatus are encrypted; and a transmission unit configured to, in the case where the packets transmitted by the user apparatus are encrypted, transmit to a mobile management switch a message indicating that the bearer directed to the IMS apparatus should be disconnected, and include in the message information indicating to the user apparatus prohibition of establishment of a bearer directed to the IMS apparatus in transmission to the mobile management switch. According to the switch, a technique is provided in which it is possible for the visited network side to operate to eliminate encrypted VoLTE communications in the case where the S8HR method VoLTE roaming is performed.

Further, the determination unit 203 may determine whether packets transmitted by the user apparatus are encrypted by querying the control apparatus. With the above arrangement, it is possible for the switch to rely on the CF 3 with respect to determining whether the packets transmitted by the user apparatus are encrypted.

Further, the information indicating to the user apparatus prohibition of establishment of a bearer directed to the IMS apparatus may include information indicating prohibition of transmission of a PDN Connectivity Request for establishing a bearer directed to the IMS apparatus while the user apparatus is in the same PLMN. With the above arrangement, it is possible to explicitly indicate to the user apparatus UE that the IMS bearer should not be established while the user apparatus UE is in the same PLMN.

Further, according to an embodiment, a communication method performed by a switch is provided. The switch is connected to a control apparatus for controlling Lawful Interception and relays packets transmitted and received between a user apparatus and an IMS apparatus in the home network of the user apparatus. The communication method includes determining whether the user apparatus is a Lawful Interception target or whether the user apparatus is a roaming user; and, in the case where the user apparatus is a Lawful Interception target or in the case where the user apparatus is a roaming user, transmitting to a mobile management switch information indicating to the user apparatus that the user apparatus should transmit and receive the packets to and from the IMS apparatus without encryption. According to the communication method, a technique is provided in which it is possible for the visited network side to operate to eliminate encrypted VoLTE communications in the case where the S8HR method VoLTE roaming is performed.

Supplementary Description of Embodiment

An embodiment described in the present specification may be applied to a system or an enhanced next generation system thereof in which LTE (Long Term Evolution), LTE-A (LTE-Advanced), SUPER 3G, IMT-Advance, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and any other appropriate system are used.

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

Determination (judgment) may be performed according to a value (0 or 1) represented by a bit, may be performed according to a boolean value (true or false), or may be performed according to comparison of numerical values (e.g., comparison with a predetermined value).

An embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

There is a case in which a user apparatus UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

As used herein, the phrase "based on" does not mean, unless otherwise noted, "based on only". In other words, the phrase "base on" means both "based on only" and "based on at least".

The present invention has been described. It is apparent for a person skilled in the art that the present invention is not limited to embodiments described in the present specification.

Modifications and variations of embodiments may be possible without departing from the spirit and the scope of the present invention defined by the claims. Therefore, descriptions of the present invention are intended for illustration and not intended for any limitations.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

It should be noted that the terms described in the present specification and/or terms necessary for understanding the present specification may be replaced by terms that have the same or similar meaning. For example, a channel and/or a symbol may be a signal. Further, a signal may be a message.

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

Input/output information, etc., may be stored in a specific place (e.g., memory) or may be stored in a management table. The input/output information, etc., may be overwritten, updated, or added. Output information, etc., may be deleted. Input information, etc., may be transmitted to another apparatus.

Transmission of predetermined information (e.g., transmission of "it is X") is not limited to explicitly-performed transmission. The transmission of predetermined information may be performed implicitly (e.g., explicit transmission of predetermined information is not performed).

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

The SGW 2 is an example of a switch. The MME 1 is an example of a mobile management switch. The IMS bearer is an example of a bearer directed to the IMS apparatus. The signal transmission unit 202 and the indication unit 204 are examples of a transmission unit.

The present application is based on and claims priority to Japanese patent application No. 2016-087512 filed on Apr. 25, 2016, the entire contents of which are hereby incorporated by reference.

DESCRIPTION OF THE REFERENCE NUMERALS

UE User apparatus
eNB Base station
1 MME
2 SGW
3 CF
4 PGW
5 P-CSCF
6 S-CSCF
101 Signal reception unit
102 Signal transmission unit
103 Management unit
104 Determination unit
201 Signal reception unit
202 Signal transmission unit
203 Determination unit
204 Indication unit
205 Communication interception unit
301 Signal reception unit
302 Signal transmission unit
303 Call processing unit
401 Signal reception unit
402 Signal transmission unit
403 Call processing unit
1001 Processor
1002 Memory
1003 Storage
1004 Communication apparatus
1005 Input apparatus
1006 Output apparatus

What is claimed is:

1. An apparatus comprising:
   a serving gateway that comprises a transmission unit; and
   a determination unit configured to determine at least one of whether a user apparatus is a Lawful Interception target and whether the user apparatus is a roaming user, in response to using S8HR (S8 Home Routed) as a roaming method,
   wherein the transmission unit transmits, in at least one of the case where the user apparatus is a Lawful Interception target and the case where the user apparatus is a roaming user, from the serving gateway to a mobile management apparatus information indicating to the user apparatus that the user apparatus should transmit and receive a packet to and from an IMS apparatus without encryption, the mobile management apparatus being different from the serving gateway.

2. The apparatus according to claim 1, wherein the determination unit determines whether the user apparatus is a Lawful Interception target by querying a control apparatus.

3. A communication method comprising:
   determining at least one of whether a user apparatus is a Lawful Interception target and whether the user apparatus is a roaming user, in response to using S8HR (S8 Home Routed) as a roaming method; and
   in at least one of the case where the user apparatus is a Lawful Interception target and the case where the user apparatus is a roaming user, transmitting, from a serving gateway to a mobile management apparatus, information indicating to the user apparatus that the user apparatus should transmit and receive a packet to and from an IMS apparatus without encryption, the mobile management apparatus being different from the serving gateway.

* * * * *